UNITED STATES PATENT OFFICE.

ERNEST SOLVAY, OF BRUSSELS, BELGIUM.

MANUFACTURE OF CHLORIDE OF LIME.

SPECIFICATION forming part of Letters Patent No. 231,860, dated August 31, 1880.

Application filed June 9, 1880. (No specimens.) Patented in England February 25, 1880.

*To all whom it may concern:*

Be it known that I, ERNEST SOLVAY, of Brussels, in the Kingdon of Belgium, manufacturer, have invented new and useful Improvements in the Manufacture of Chloride of Lime, (for which I have obtained a Patent in England, No. 839, bearing date February 25, 1880, of which the following is a specification.

Considerable difficulty is experienced in causing lime to absorb chlorine, especially diluted chlorine, such as is obtained in the processes which yield chlorine mixed with air and nitrogen. Many apparatus have been proposed with a view of converting as easily as possible lime into chloride of lime.

I have invented the following process: The lime is slaked by means of a suitable quantity of water, so as to form a mortar of sufficient consistency. This mortar is then divided into small fragments, or, by preference, is converted into little balls, by means of special machinery, and it is then dried at the requisite temperature to drive out all the water exceeding the quantity necessary to form hydrate of lime. This may be effected by mechanical means. I then place these fragments of hydrate of lime loosely in an upright cylinder, or in several reservoirs arranged systematically, and into the said cylinder or reservoirs I introduce gaseous chlorine, so that it shall always come first in contact with that portion of the material which has already been subjected for some time to the action of the chlorine, and shall finally pass on to the material which has been freshly charged into the cylinder or into the systematically-arranged reservoirs. By this means I obtain chloride of lime in fragments or balls, and the chlorine is absorbed completely if the operation be carried on in apparatus sufficiently capacious in width and height or in a sufficient number of apparatus.

I claim as my invention—

In the manufacture of chloride of lime, forming hydrate of lime into small fragments or agglomerated morsels, by which the complete absorption of the chlorine is effected, substantially as described.

ERNEST SOLVAY.

Witnesses:
   R. S. KIRKPATRICK,
   H. T. E. KIRKPATRICK.